United States Patent [19]

Amemori et al.

[11] Patent Number: 4,694,702
[45] Date of Patent: Sep. 22, 1987

[54] VORTEX SHEDDING FLOWMETER

[75] Inventors: Hiroyuki Amemori, Kawasaki; Shigeru Nishiyama, Hiratsuka; Tetsuo Iwamoto, Yokohama, all of Japan

[73] Assignee: Tokico Ltd., Japan

[21] Appl. No.: 774,804

[22] Filed: Sep. 11, 1985

[30] Foreign Application Priority Data

Sep. 12, 1984 [JP] Japan .................... 59-138477[U]
Jun. 20, 1985 [JP] Japan .................... 60-134895

[51] Int. Cl.⁴ .............................................. G01F 1/32
[52] U.S. Cl. .................................................. 73/861.24
[58] Field of Search ............... 73/861.22, 861.24, 702, 73/718

[56] References Cited

U.S. PATENT DOCUMENTS

| 4,085,614 | 4/1978 | Curran et al. | 73/861.24 |
| 4,161,878 | 7/1979 | Fussell, Jr. | |
| 4,466,290 | 8/1984 | Fricit | 73/718 |
| 4,572,000 | 2/1986 | Koolman | 73/718 |
| 4,584,883 | 4/1986 | Miyoshi et al. | 73/861.24 |

FOREIGN PATENT DOCUMENTS

| 0055169 | 6/1982 | France . |
| 0054868 | 4/1982 | Japan .................... 73/861.24 |
| 1566790 | 5/1980 | United Kingdom . |
| 2084324 | 8/1984 | United Kingdom . |

Primary Examiner—Herbert Goldstein
Attorney, Agent, or Firm—Andrus, Sceales, Starke & Sawall

[57] ABSTRACT

A vortex shedding flowmeter comprises a flow passage through which a fluid flows, a bluff body arranged in the flow passage for generating Karman vortex of the fluid and provided with a pair of holes which open to respective side surfaces of the bluff body and extend toward and penetrate through one end of the bluff body for introducing a pressure change caused by the Karman vortex, a body which is an independent member from the bluff body, a pair of detecting parts provided in the body and comprising a pair of recesses provided on the body, a pair of fixed electrodes and a pair of movable electrodes provided in the recesses with a predetermined distance therebetween, a communicating hole provided in the body for communicating a pair of spaces formed between the fixed and movable electrodes, and a sealed fluid sealed in the spaces and the communicating hole, where the movable electrodes are displaced responsive to the pressure change in the fluid introduced from the bluff body and received by surfaces of the variable electrodes opposite to surfaces in contact with the sealed fluid and the fixed and movable electrodes constitute a pair of variable capacitors, and a detecting circuit for generating an electrical output responsive to changes in capacitances of the variable capacitors.

7 Claims, 11 Drawing Figures

VORTEX SHEDDING FLOWMETER

BACKGROUND OF THE INVENTION

The present invention generally relates to vortex shedding flowmeters, and more particularly to a vortex shedding flowmeter in which a bluff body having a simple construction is provided in a flow passage of a fluid for generating Karman vortex of the fluid which is to be measured.

Conventionally, a vortex shedding flowmeter has been reduced to practice wherein a bluff body is provided in a flow passage of a fluid and the current and flow rate of the fluid which is to be measured (hereinafter simply referred to as the measuring fluid) are detected by detecting a pressure change corresponding to the Karman vortex of fluid generated by the bluff body on the downstream side of the bluff body. In the conventional vortex shedding flowmeter of the type which uses electrostatic capacitance type detecting parts, a recess is provided on both side surfaces of the bluff body, and a fixed electrode plate and a diaphragm are provided in each recess. A minute gap is formed between the diaphragm and the fixed electrode plate, and the diaphragm is used as a movable electrode which is subjected to the pressure change of the measuring fluid. A fluid is sealed in a space between the fixed electrode plate and the diaphragm, and a pair of such spaces formed in the bluff body communicate with each other through a communicating passage. In this conventional vortex shedding flowmeter, the Karman vortex of the measuring fluid which passes both sides of the bluff body as the measuring fluid flows, is alternately generated on the downstream side of the bluff body along both side surfaces of the bluff body. The pair of diaphragms are displaced responsive to the pressure change of the measuring fluid caused by the Karman vortex, and the flow rate of the measuring fluid is measured by electrically detecting the change in the electrostatic capacitance which is formed between the diaphragm and the fixed electrode plate.

However, in order to improve the accuracy of the flow rate measurement in the conventional vortex shedding flowmeter, that is, to improve the accuracy with which the electrostatic capacitance is detected, it is necessary to accurately set the minute gap between the fixed electrode plate and the diaphragm which is used as the movable electrode to a predetermined distance. The recess into which the fixed electrode plate is fixed, must be formed with a high accuracy. Generally, however, the bluff body has a triangular or an approximately trapezoidal cross section, and it is extremely difficult to form the recesses on both side surfaces of the bluff body with a high accuracy because the side surfaces of the bluff body are mutually inclined by a predetermined angle. In addition, a similar difficulty is faced when welding the diaphragms so as to cover the respective recesses of the bluff body with a high accuracy. As a result, there are disadvantages in that the number of manufacturing processes are increased and the manufacturing cost becomes high. Especially since the troublesome process of forming the recesses on the side surfaces of each of the different bluff bodies must be performed for each of the vortex shedding flowmeters having flow passages of different diameters, the manufacturing cost of the vortex shedding flowmeter becomes high also from this point of view.

On the other hand, when a vibration occurs in the flow passage through which the measuring fluid flows, the fluid sealed in the detecting parts also vibrates, and there is a problem in that an erroneous detection may be performed. Hence, the present inventors have worked on the vibration in the flow passage, and as a result, the present inventors have found that the vibration in the flow passage rarely occurs in the longitudinal direction of the flow passage but occurs in most cases in a lateral direction which is perpendicular to the longitudinal direction of the flow passage. But in the conventional vortex shedding flowmeter, the communicating passage which communicates the pair of spaces in the detecting parts extends in the lateral direction which is perpendicular to the longitudinal direction of the flow passage. For this reason, when the fluid sealed in the pair of spaces and the communicating passage vibrates together with the flow passage, the sealed fluid is moved in mutually opposite directions with respect to the pair of spaces and the erroneous detection occurs. In the case where the amplification and sensitivity of a detecting circuit is reduced so as to reduce the effects of the vibration, the measuring sensitivity becomes reduced and there are disadvantages in that it becomes impossible to measure a minute flow rate and the range in which the flow rate can be measured becomes narrow.

SUMMARY OF THE INVENTION

Accordingly, it is a general object of the present invention to provide a novel and useful vortex shedding flowmeter in which the disadvantages described heretofore are eliminated.

Another and more specific object of the present invention is to provide a vortex shedding flowmeter in which an electrostatic capacitance type detecting parts are provided outside a bluff body and a change (difference) in the pressure of a measuring fluid on both side surfaces of the bluff body is introduced into the detecting parts. According to the vortex shedding flowmeter of the present invention, the detecting parts are not provided in the bluff body and it is sufficient to simply provide differential pressure introducing holes. Hence, it is unnecessary to form recesses in the bluff body with a high accuracy as is required in the conventional example described before, and the vortex shedding flowmeter can be manufactured with ease at a low cost. In addition, the detecting parts can be used in common for different vortex shedding flowmeters regardless of the diameter of a flow passage to which the vortex shedding flowmeter is applied. As a result, it is sufficient to simply prepare a bluff body having differential pressure introducing holes in accordance with the diameter of the flow passage, and the manufacturing cost of the vortex shedding flowmeter is also reduced from this point of view.

Still another object of the present invention is to provide a vortex shedding flowmeter in which the pair of detecting parts are arranged so that an imaginary line connecting the detecting parts having the fluid sealed therebetween extends in a lateral direction which is perpendicular to the longitudinal direction of the flow passage for the measuring fluid. According to the vortex shedding flowmeter of the present invention, the vortex shedding flowmeter is hardly affected by a vibration in the flow pasage through which the measuring fluid flows, and it is possible to accurately measure the flow rate even down to a small flow rate.

DETAILED DESCRIPTION

Figures 1, 2:
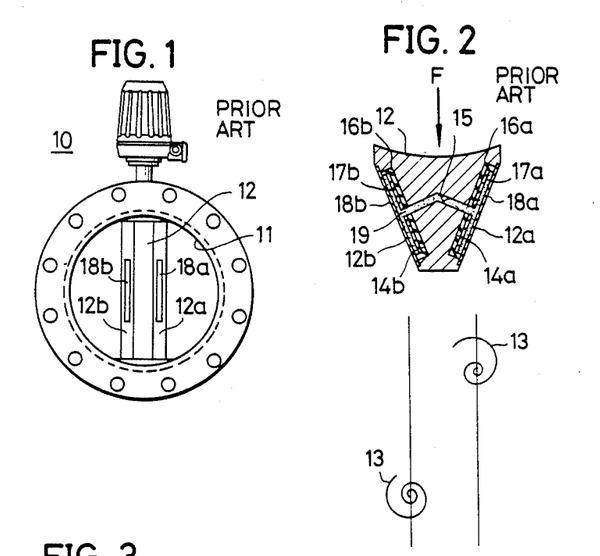
FIG. 1 is a rear view showing an example of a conventional vortex shedding flowmeter.
FIG. 2 shows a lateral cross section of the vortex shedding flowmeter shown in FIG. 1.

A conventional vortex shedding flowmeter generally has the construction shown in FIG. 1. In FIG. 1, a vortex shedding flowmeter 10 comprises a flow passage 11 having a flange, and a bluff body 12 having a lateral cross section of the shape shown in FIG. 2 extends vertically within the flow passage 11. When the measuring fluid flows through the flow passage 11 in a direction of an arrow F shown in FIG. 2, a Karman vortex 13 is alternately generated on the downstream side of the bluff body 12 along both side surfaces 12a and 12b of the bluff body 12. Depressions 14a and 14b are formed on the respective side surfaces 12a and 12b of the bluff body 12, and the bluff body 12 is also provided with a communicating passage 15. Fixed electrode plates 17a and 17b are provided in the respective recesses 14a and 14b through respective insulators 16a and 16b. Metal diaphragms 18a and 18b which are used as movable electrode plates, are provided on the respective side surfaces 12a and 12b with a predetermined distance from the respective fixed electrode plates 17a and 17b. A sealed fluid 19 is sealed in a space between the fixed electrode plate 17a and the diaphragm 18a, a space between the fixed electrode plate 17b and the diaphragm 18b, and the communicating passage 15.

When the measuring fluid flows and the Karman vortex 13 is alternately generated as described before, a pressure difference is introduced between one of the diaphragms 18a and 18b provided on the side where the vortex is generated and the other of the diaphragms 18a and 18b on the side where the vortex is generated. The diaphragms 18a and 18b are displaced proportionally to the frequency with which the vortex is generated, due to the pressure difference between the diaphragms 18a and 18b. Hence, the electrostatic capacitance between the fixed electrode plate 17a and the diaphragm 18a and the electrostatic capacitance between the fixed electrode plate 17b and the diaphragm 18b change responsive to the displacement of the diaphragms 18a and 18b, and the flow rate is measured by electrically detecting the change in the electrostatic capacitance.

However, in the conventional vortex shedding flowmeter 10, the bluff body 12 is provided with detecting means comprising the fixed electrode plates 17a and 17b, the diaphragms 18a and 18b, and the sealed fluid 19. For this reason, the recesses 14a and 14b must be formed on the bluff body 12. In addition, since the gap between the fixed electrode plate 17a and the diaphragm 18a and the gap between the fixed electrode plate 17b and the diaphragm 18b must be set with a high accuracy, the recesses 14a and 14b must be formed with a high accuracy and the fixed electrode plates 17a and 17b and the diaphragms 18a and 18b must be mounted with a high accuracy. As a result, the conventional vortex shedding flowmeter 10 suffers disadvantages in that the process of forming the bluff body 12 is troublesome to perform and the manufacturing cost of the vortex shedding flowmeter 10 is high. Further, a bluff body having a different and complex construction must be prepared for each of vortex shedding flowmeters having flow passages of different diameters, and the manufacturing cost of the vortex shedding flowmeter 10 becomes high also from this point of view.

Figure 3:
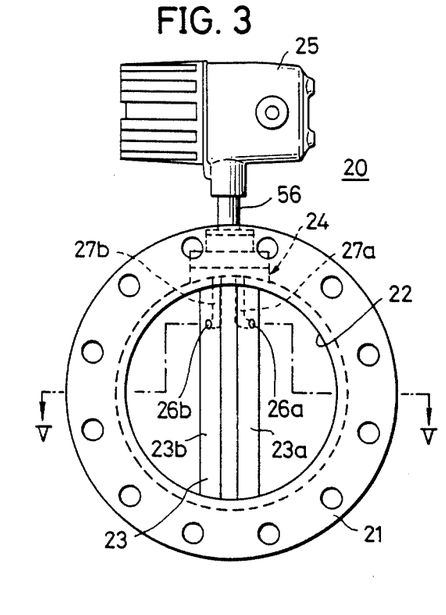
FIG. 3 is a rear view showing an embodiment of the vortex shedding flowmeter according to the present invention.
Figure 4:
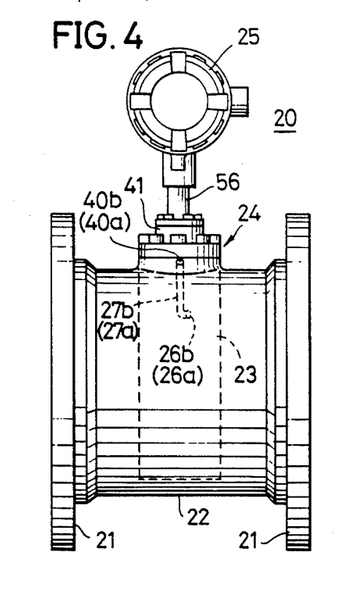
FIG. 4 is a side view showing the vortex shedding flowmeter shown in FIG. 3.
Figure 5:
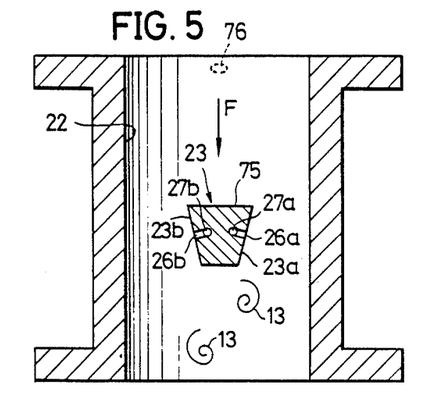
FIG. 5 is a plan view of a lateral cross section along a line V—V in FIG. 3.

The present invention has eliminated the disadvantages of the conventional vortex shedding flowmeter described heretofore, and description will now be given with respect to a first embodiment of the vortex shedding flowmeter according to the present invention by referring to FIGS. 3 through 7. As shown in FIGS. 3 through 5, a vortex shedding flowmeter 20 according to the present invention generally comprises a flow passage 22 having a flange 21, a bluff body 23 provided in a central part of the flow passage 22 and extending in a vertical direction, a detecting part 24 provided in relation to the bluff body 23 at an upper part outside the flow passage 22, and a detecting circuit electrically coupled to the detecting part 24 and accommodated within a circuit accommodating case 25. Description on the detecting circuit will be given later on in the specification. Differential pressure introducing openings 26a and 26b open at upper parts of respective side surfaces 23a and 23b of the bluff body 23. Differential pressure introducing holes 27a and 27b communicate with the respective openings 26a and 26b and extend upwardly within the bluff body 23. The openings 26a and 26b simply needs to be provided symmetrically with respect to the right and left of bluff body 23, and the openings 26a and 26b and the differential pressure introducing holes 27a and 27b do not need to be formed with a high accuracy thus making it possible to manufacture the bluff body 23 at a low cost. The upper part of the bluff body 23 penetrates the wall of the flow passage 22 and projects outside the flow passage 22.

Figure 6:
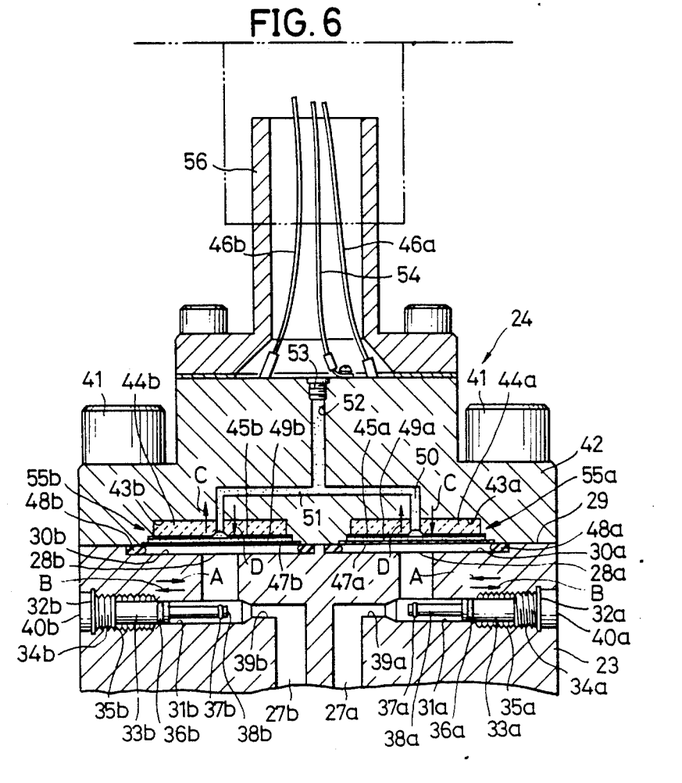
FIG. 6 is a front view on an enlarged scale showing a vertical cross section of a detecting part of the vortex shedding flowmeter shown in FIG. 3.

As shown in FIG. 6, ends 28a and 28b of the differential pressure introducing holes 27a and 27b open to respective circular recesses 30a and 30b which are formed on an upper surface 29 of the bluff body 23. End parts 40a and 40b of branching passages 31a and 31b of the respective differential pressure introducing holes 27a and 27b, open to the outside at the side surfaces of the bluff body 23. Plugs 33a and 33b are fitted into the respective branching passages 31a and 31b and are stopped by stop rings 32a and 32b so as not to slip out of the branching passages 31a and 31b. Heads 34a and 34b of the plugs 33a and 33b *are threaded, and the threaded heads 34a* and 34b are screwed into respective threaded parts 35a and 35b formed on the surfaces of the branching passages 31a and 31b. O-rings 36a and 36b are fitted over large-diameter intermediate parts of the plugs 33a and 33b, and O-rings 37a and 37b are fitted over small-diameter tip end parts 38a and 38b of the plugs 33a and 33b. The O-rings 36a, 36b, 37a, and 37b prevent the measuring fluid from leaking to the outside through the branching passages 31a and 31b and the differential pressure introducing holes 27a and 27b. Top surfaces of the heads 34a and 34b of the plugs 33a and 33b, are provided with grooves for engaging a tip end of a screwdriver having a "−" or "+" cross section. When the plugs 33a and 33b are rotated by the screwdriver, the plugs 33a and 33b move in the direction of an arrow A or B in the respective branching passages 31a and 31b. For example, when the plugs 33a and 33b move in the direction A, the tip end parts 38a and 38b of the plugs 33a and 33b enter within small-diameter parts 39a and 39b of the respective differential pressure introducing holes 27a and 27b and the differential pressure introducing holes 27a and 28b are closed by the tip end parts 38a and 38b. The plugs 33a and 33b are at positions not closing the differential pressure introducing holes 27a and 27b as shown in FIG. 6 while measuring the current or the flow rate of the measuring fluid.

A mounting member 42 made of stainless steel is mounted on the flow passage 22 through the bluff body 23 by screws 41, in a state where the mounting member 42 is in close adherence with the upper surface 29 of the bluff body 23. Circular recesses 43a and 43b are formed on the mounting member 42. Ceramic substrates 44a and 44b which are used as electrically insulating members, are fixed in the respective recesses 43a and 43b. A circular fixed electrode 45a constituted by a conductive film is fixed on one surface of the substrate 44a, and a circular fixed electrode 45b constituted by a conductive film is fixed on one surface of the substrate 44b. Accordingly, the electrodes 45a and 45b are electrically insulated with respect to the mounting member 42 by the substrates 44a and 44b. Lead wires 46a and 46b are electrically connected to the respective electrodes 45a and 45b. Circular diaphragms 47a and 47b made of stainless steel are used as moveable electrodes. The peripheries of the diaphragms 47a and 47b are welded to the mounting member 42 so that a minute gap is formed between the electrode 45a and the diaphragm 47a and a minute gap is formed between the electrode 45b and the diaphragm 47b. Upper surfaces of the recesses 30a and 30b are formed by the diaphragms 47a and 47b, and the bluff body 23 and the mounting member 42 are sealed by sealings 48a and 48b. A space 49a between the electrode 45a and the diaphragm 47a and a space 49b between the electrode 45b and the diaphragm 47b are separated from the recesses 30a and 30b by the diaphragms 47a and 47b. The spaces 49a and 49b communicate with each other through a communicating hole 50 formed in the mounting member 42 and the substrates 44a and 44b, and an incompressible fluid 51 such as silicon oil is sealed within the spaces 49a and 49b and the communicating hole 50. In order to seal the incompressible fluid 51 within the communicating hole 50 and the like, the mounting member 42 is provided with a hole 52 which communicates with the communicating hole 50, and the hole 52 is closed by a plug 53. Because the diaphragms 47a and 47b are welded to the mounting member 42, the diaphragms 47a and 47b are electrically coupled to the mounting member 42. Lead wires 54 are connected to the mounting member 42. The diaphragm 47a and the electrode 45a constitute a variable capacitor 55a and the diaphragm 47b and the electrode 45b constitute another variable capacitor 55b. The lead wires 46a, 46b, and 54 pass through a pipe 56 and are lead within the accommodating case 25.

Figure 7:
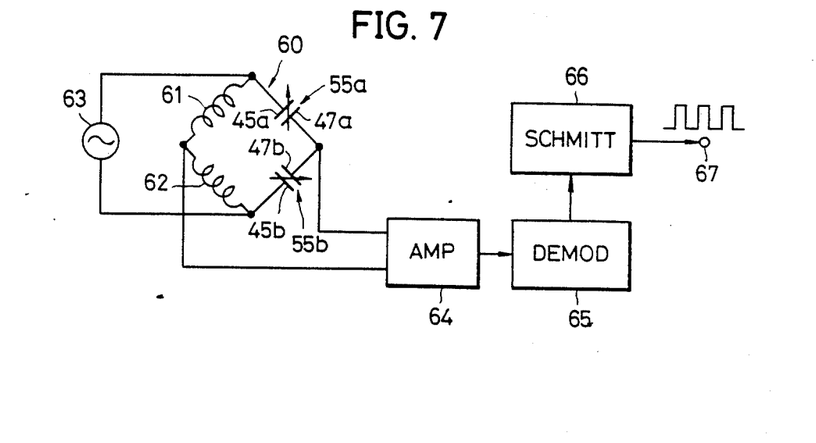
FIG. 7 is a circuit diagram showing an example of a detecting circuit.

As shown in FIG. 7, coils 61 and 62 which constitute a bridge circuit 60 together with the capacitors 55a and 55b, an A.C. power source 63 for supplying an A.C. current to the bridge circuit 60, an amplifying circuit 64 for amplifying the output of the bridge circuit 60, a demodulating circuit 65, and a Schmitt circuit 66 are provided within the accomodating case 25. A pulse signal having a repetition frequency proportional to the current of the measuring fluid is generated from the Schmitt circuit 66 and is supplied to a circuit in a subsequent stage through an output terminal 67.

When the measuring fluid flows through the flow passage 22 in the direction of an arrow F in the vortex shedding flowmeter 20 having the construction described heretofore, the Karman vortex 13 is alternately formed by the bluff body 23 on both sides of the bluff body 23. Hence, pressure changes of the measuring fluid with opposite phases occur on the side surfaces 23a and 23b of the bluff body 23. The pressure change occurring on the side surface 23a of the bluff body 23 is transmitted to one surface of the diaphragm 47a by way of the opening 26a, the differential pressure introducing hole 27a, and the recess 30a. On the other hand, the pressure change occurring on the side surface 23b of the bluff body 23 is transmitted to one surface of the diaphragm 47b by way of the opening 26b, the differential pressure introducing hole 27b, and the recess 30b. The diaphragms 47a and 47b are alternately displaced in the directions of arrows C and D with opposite phases responsive to the pressure changes, and as a result, the capacitance of the capacitor 55a increases and decreases while the capacitance of the capacitor 55b decreases and increases. The period with which the capacitances of the capacitors 55a and 55b change, is in correspondence with the period with which the Karman vortex 13 is generated and is inversely proportional to the current of the measuring fluid. Accordingly, the bridge circuit 60 generates an output which is obtained by amplitude-modulating the signal from the A.C. power source 63 at a frequency proportional to the current, and the pulse signal having a repetition frequency proportional to the current is generated from the Schmitt circuit 66. The current or the flow rate of the measuring fluid can be obtained by measuring the period or counting the pulses of the pulse signal generated from the Schmitt circuit 66.

The mounting member 42 itself does not have a special shape as in the case of the bluff body 23, and thus, the recesses 43a and 43b can be formed with ease. In addition, the process of welding the diaphragms 47a and 47b on the mounting member 42 can be performed with ease.

In the present embodiment, the diaphragms 47a and 47b are arranged so that the pressure receiving surfaces thereof lie in the same plane, and moreover, the bridge circuit 60 and the like are provided. Hence, noise of the same phase such as the vibrations of the diaphragms 47a and 47b caused by an external vibration applied to the flow passage 22 cancel each other, and an erroneous detection is effectively prevented from being performed.

In cases where the sensitivities of the diaphragms 47a and 47b become deteriorated due to foreign particles adhered on the diaphragms 47a and 47b after the vortex shedding flowmeter is used for a certain length of time or an abnormality occurs in the variable capacitors 55a and 55b, the plugs 33a and 33b are rotated so as to close the small-diameter parts 39a and 39b by the tip end parts 38a and 38b of the plugs 33a and 33b. Thus, the mounting member 42 can be removed from the bluff body 23 without removing the measuring fluid in the flow passage 22 so that the diaphragms 47a and 47b can be cleaned and repaired, and the measuring fluid will not leak outside the vortex shedding flowmeter even when the measuring fluid in the flow passage 22 is not removed.

Figure 8:
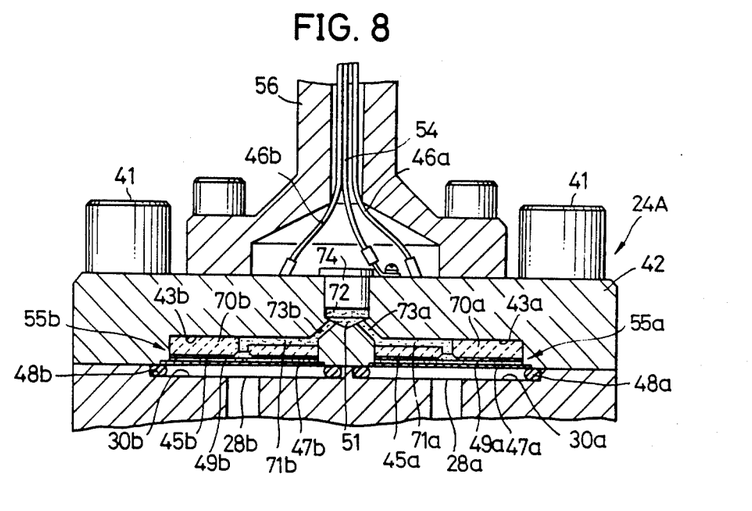
FIG. 8 is a front view showing a vertical cross section of an essential part of another embodiment of the detecting part.

FIG. 8 shows another embodiment of the detecting part. In FIG. 8, whose parts which are the same as those corresponding parts in FIG. 6 are designated by the same reference numerals, and description thereof will be omitted.

In the present embodiment, a detecting part 24A is designed so that a passage which communicates the space 49a formed between the electrode 45a and the diaphragm 47a of the variable capacitor 55a and the space 49b formed between the electrode 45b and the diaphragm 47b of the variable capacitor 55b, can be formed in the mounting member 42 with ease. Grooves 71a and 71b which extend in directions so as to close upon each other are provided above ceramic substrates 70a and 70b. Oblique communicating holes 73a and 73b are formed in the mounting member 42 so as to communicate a hole 72 in which the sealed fluid is sealed with mutually closing ends of the grooves 71a and 71b. The communicating holes 73a and 73b can be formed with ease by drilling from the recesses 43a and 43b toward the hole 72.

In each of the embodiments described heretofore, the differential pressure introducing holes 27a and 27b are provided in the bluff body 23 and the openings 26a and 26b are provided on the respective side surfaces 23a and 23b of the bluff body 23. However, the present invention is not limited to such a construction, and for example, the differential pressure introducing holes 27a and 27b may be formed in the wall of the flow passage 22 and the openings 26a and 26b may be formed on the inner wall of the flow passage 22. In addition, it is possible to provide one of the differential pressure introducing holes 27a and 27b in the bluff body 23 and provide the other of the differential pressure introducing holes 27a and 27b in the wall of the flow passage 22. Further, the opening of the other differential pressure introducing hole may be provided on a front surface 75 of the bluff body 23 opposing the flow of the measuring fluid or at a position 76 on the flow passage 22 on the upstream side of the bluff body 23, for example, so that the pressure change corresponding to the vortex is not transmitted to the diaphragm corresponding to this other differential pressure introducing hole.

As described before, the vortex shedding flowmeter according to the present invention comprises the bluff body which is an independent body from the mounting member, and the variable capacitors are provided on this mounting member. For this reason, the process of mounting the variable capacitors on the mounting member can be performed with ease, and the number of processes required to manufacture the vortex shedding flowmeter can be reduced considerably. The length of the bluff body differs depending on the diameter of the flow passage to which the vortex shedding flowmeter according to the present invention is applied. However, since the detecting part is not provided in the bluff body and it is sufficient to provide the differential pressure introducing holes, it is possible to manufacture various kinds of bluff bodies with ease at a low manufacturing cost. In addition, the detecting part can be used in common regardless of the length of the bluff body, and the manufacturing cost of the vortex shedding flowmeter is also reduced from this point of view.

When an external vibration is applied to the flow passage 22, the detecting parts 24 and 24A vibrate together with the flow passage 22. However, as described before, the vibration applied to the flow passage 22 occurs in most cases in the lateral direction which is perpendicular to the longitudinal direction of the flow passage 22 rather than in the longitudinal direction of the flow passage 22. When the detecting parts 24 and 24A vibrate in the lateral direction (right and left directions in FIGS. 6 and 8), the sealed fluid 51 also vibrates in the lateral direction. Hence, the surfaces of the diaphragms 47a and 47b closer to the spaces 49a and 49b are alternately subjected to pressure responsive to the frequency of the vibration, and there is a problem in that an erroneous detection is performed due to the external vibration. Accordingly, in order to eliminate the above problem, another embodiment of the vortex shedding flowmeter according to the present invention which will be described hereinafter is designed so as to reduce the possibility of such an erroneous detection being performed.

Figure 9:
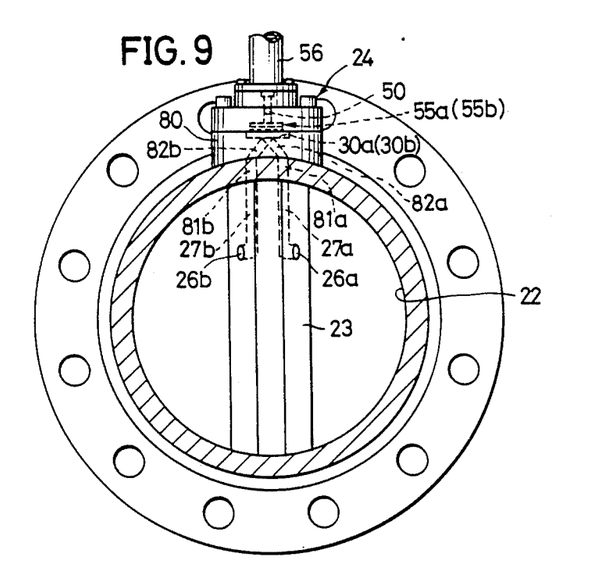
FIG. 9 is a rear view showing another embodiment of the vortex shedding flowmeter according to the present invention.
Figure 10:
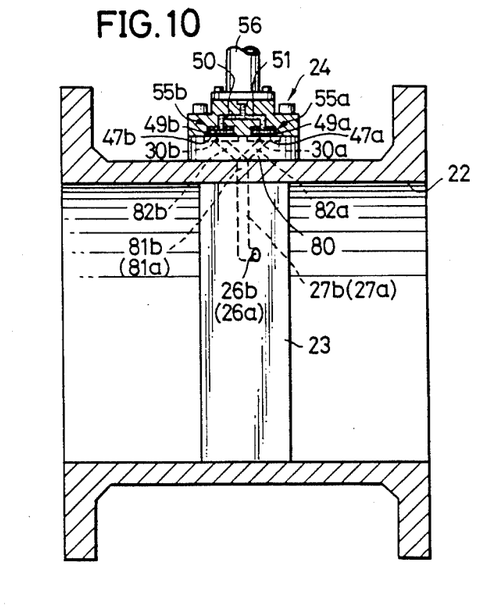
FIG. 10 is a side view showing a vertical cross section of the vortex shedding flowmeter according to the present invention.

In a second embodiment of the vortex shedding flowmeter according to the present invention shown in FIGS. 9 and 10, those parts which are the same as those corresponding parts in FIGS. 3 through 6 are designated by the same reference numerals and description thereof will be omitted.

An introducing hole forming member 80 is provided between the outer peripheral wall of the flow passage 22 and the detecting part 24. The bluff body 23 is identical to the bluff body in the embodiments described before. Differential pressure introducing holes 81a and 81b which communicate with respective differential pressure introducing holes 27a and 27i b, penetrate the wall of the flow passage 22. Instead of providing the differential pressure introducing holes 81a and 81b, the bluff body 23 may penetrate the wall of the flow passage 2 similarly as in the case of the embodiments described before.

The detecting part 24 (or 24A) which is identical to that in the embodiment described before is provided on the member 80, facing a direction which is deviated by 90° from that of the embodiment described before. In other words, the pair of variable capacitors 55a and 55b are separated from each other and are aligned in the longitudinal direction of the flow passage 22. Oblique differential pressure introducing holes 82a and 82b are provided in the member 80. The oblique differential pressure introducing holes 82a and 82b communicate the differential pressure introducing holes 27a, 27b, 81a, and 81b with the respective recesses 30a and 30b corresponding to the variable capacitors 55a and 55b which are separated from each other and exist in the longitudinal direction of the flow passage 22. Accordingly, the pressure of the measuring fluid introduced through the opening 26a is transmitted to the recess 30a by way of the differential pressure introducing holes 27a, 81a, and 82a. On the other hand, the pressure of the measuring fluid introduced through the opening 26b is transmitted to the recess 30b by way of the differential pressure introducing holes 27b, 81b, and 82b.

In the present embodiment, the variable capacitors 55a and 55b of the detecting part 24 are arranged in the longitudinal direction of the flow passage 22. Moreover, the communicating hole 50 which communicates the spaces 49a and 49b of the variable capacitors 55a and 55b and in which the sealed fluid 51 is sealed, exists in the longitudinal direction of the flow passage 22. Hence, even when the flow passage 22 vibrates in the lateral direction and the sealed fluid 51 vibrates similarly, the pressure change caused by the vibration of the sealed fluid 51 will not act on the diaphragms 47a and 47b. In addition, even if the pressure change caused by the vibration of the sealed fluid 51 were to act on the diaphragms 47a and 47b, the pressure change will act on the diaphragms 47a and 47b with the same phase. Therefore, the pressure change acting on the diaphragm 47a and the pressure change acting on the diaphragm 47b will cancel each other, and an erroneous detection will not be performed.

In the present embodiment, the member 80 comprising the differential pressure introducing holes 82a and 82b is used to communicate the openings 26a and 26b which are separated from each other in the lateral direction of the flow passage 22 with the recesses 30a and 30b which are separated from each other in the longitudinal direction of the flow passage 22. However, the member 80 may be omitted by using a bluff body 90 having a lateral cross section shown in FIG. 11.

Figure 11:
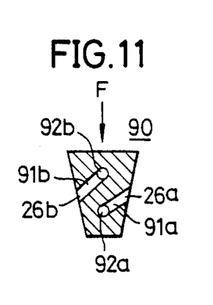
FIG. 11 is a plan view of a lateral cross section of another embodiment of a bluff body.

The bluff body 90 is provided with holes 91a and 91b which extend in mutually opposite directions from the openings 26a and 26b on the side surfaces of the bluff body 90 and holes 92a and 92b which extend upwardly from respective ends of the holes 91a and 91b. The holes 92a and 92b are separated in the longitudinal direction of the flow passage 22, and communicate as they are with the respective recesses 30a and 30b which are separated in the longitudinal direction of the flow passage 22 as shown in FIG. 10.

Further, the present invention is not limited to these embodiments, but various variations and modifications may be made without departing from the scope of the present invention.

What is claimed is:

1. A vortex shedding flowmeter for measuring a flow rate of a fluid which flows through a flow passage, said vortex shedding flowmeter comprising: a bluff body arranged in said flow passage for generating Karman vortices of said fluid, said bluff body being provided with a pair of differential pressure introducing holes for introducing a pressure change caused by the generation of the Karman vortices of said fluid, said differential pressure change holes opening to respective side surfaces of said bluff body and penetrating through said bluff body to open to one end of said bluff body; and a main detecting part which is independent of said bluff body, said main detecting part comprising a mounting member which is mounted on said one end of said bluff body, a pair of detecting means provided in said mounting member and a detecting circuit, said pair of detecting means being arranged separated from each other in a longitudinal direction of said flow passage and comprising a pair of first recesses provided on said mounting member, a pair of fixed electrodes mounted in said pair of first recesses, a pair of movable electrodes provided in said pair of first recesses with a predetermined distance from the respective pair of fixed electrodes, a channel provided in said mounting member for communicating a pair of spaces formed between said pair of fixed electrodes and said pair of movable electrodes, and an incompressible fluid filled up in said pair of spaces and said channel, each of said movable electrodes comprising a diaphragm which is displaced responsive to the pressure change in said fluid introduced through a corresponding one of said pair of differential pressure introducing holes and received by a surface of said diaphragm opposite to surfaces in contact with said incompressible fluid, said pair of fixed electrodes and said pair of movable electrodes constituting a pair of variable capacitors, said detecting circuit generating an electrical output responsive to changes in capacitances of said variable capacitors of said pair of detecting parts.

2. A vortex shedding flowmeter as claimed in claim 1 in which said bluff body comprises one end part which penetrates through a wall defining said flow passage and extends outside said flow passage, and a pair of second recesses communicated with said pair of differential pressure introducing holes, said pair of second recesses being provided on an end surface on said one end part of said bluff body, said mounting member being mounted on the end surface on said one end part of said bluff body so that the surfaces of said pair of movable electrodes opposite to the surfaces in contact with said incompressible fluid respectively face the pair of second recesses of said bluff body.

3. A vortex shedding flowmeter as claimed in claim 2 in which said bluff body comprises a pair of plugs provided at an end part thereof, said pair of plugs perform an operation of communicating or blocking said pair of differential pressure introducing holes with respect to said pair of second recesses.

4. A vortex shedding flowmeter as claimed in claim 1 in which said channel communicates to said pair of spaces via parts of said pair of first recesses which parts are closest to each other.

5. A vortex shedding flowmeter as claimed in claim 1 in which said detecting circuit comprises a bridge circuit having said pair of variable capacitors and coils coupled in a bridge connection, and a circuit for producing a pulse signal from an output of said bridge circuit.

6. A vortex shedding flowmeter as claimed in claim 1 in which said pair of differential pressure introducing holes of said bluff body are arranged separated from each other in a lateral direction perpendicular to the longitudinal direction of said flow passage, said vortex shedding flowmeter further comprising an introducing hole forming member which is provided between said bluff body and said mounting member, said introducing hole forming member comprising a pair of recesses which are arranged on an upper end surface thereof and are separated from each other in the longitudinal direction of said flow passage so as to face said movable electrodes of said pair of detecting means, and a pair of holes which obliquely penetrate said introducing hole forming member so as to communicate upper ends of said pair of differential pressure introducing holes of said bluff body with said pair of recesses of said introducing hole forming member.

7. A vortex shedding flowmeter as claimed in claim 1 in which said pair of differential pressure introducing holes of said bluff body are arranged separated from each other in the longitudinal direction of said flow passage.

* * * * *